July 1, 1969

B. A. JONES ET AL 3,452,769

AERODYNAMIC GAS VALVE TAB CONTROL

Filed May 18, 1966

INVENTORS
BURTON A. JONES
LARRY E. FIDLER
BY Jack N. McCarthy
AGENT

United States Patent Office 3,452,769
Patented July 1, 1969

3,452,769
AERODYNAMIC GAS VALVE TAB CONTROL
Burton A. Jones, North Palm Beach, Fla., and Larry E. Fidler, Littleton, Colo., assignors to United Aircraft Corporation, East Hartford, Conn., a corporation of Delaware
Filed May 18, 1966, Ser. No. 550,973
Int. Cl. F15c 1/08, 3/00
U.S. Cl. 137—81.5        21 Claims

ABSTRACT OF THE DISCLOSURE

An aerodynamic gas valve having a first conduit means with an outlet conduit means connected thereto having two outlet passages. A means being provided to direct flow from the first conduit means for distribution between the two passages of said outlet conduit means. Said directing means including a tab movable into and out of the flow from said first conduit means with said tab having a leading edge located at an angle of less than 90 degrees to the direction of movement of said tab. Means are also provided for directing a flow of fluid into a setback portion at a point opposite from said tab.

---

The present invention relates to a control tab for insertion into an aerodynamic gas valve to control flow direction.

An object of this invention is to provide a contoured tab to move the flow in an aerodynamic gas valve from one passage to another.

Another object of this invention is to provide a tab with a straight edge placed at an angle to the direction of motion of said tab.

A further object of this invention is to provide a tab which will provide a smooth transition of flow as it is inserted across the flow path of a hot gas valve.

Another object of this invention is to provide a tab which, when immersed in a flow passage of an aerodynamic valve, will give a desirable change in side force with a change in tab position.

A further object of this invention is to provide a tab so contoured that a given tab immersion depth results in a given side force. In other words, the curve made by tab immersion depth plotted against side force would be the same for the immersion of the tab as well as withdrawal.

Another object of this invention is to provide a gas bleed system to direct a flow toward the leading edge of the tab from the setback region.

A further object of this invention is to provide a tab whose movement gives improved proportionate control of side force.

Another object of this invention is to provide a tab controlled device which reduces the complexity of electronics for operation.

Other objects and advantages will be seen from the following detailed specification and drawings.

Figure 1:
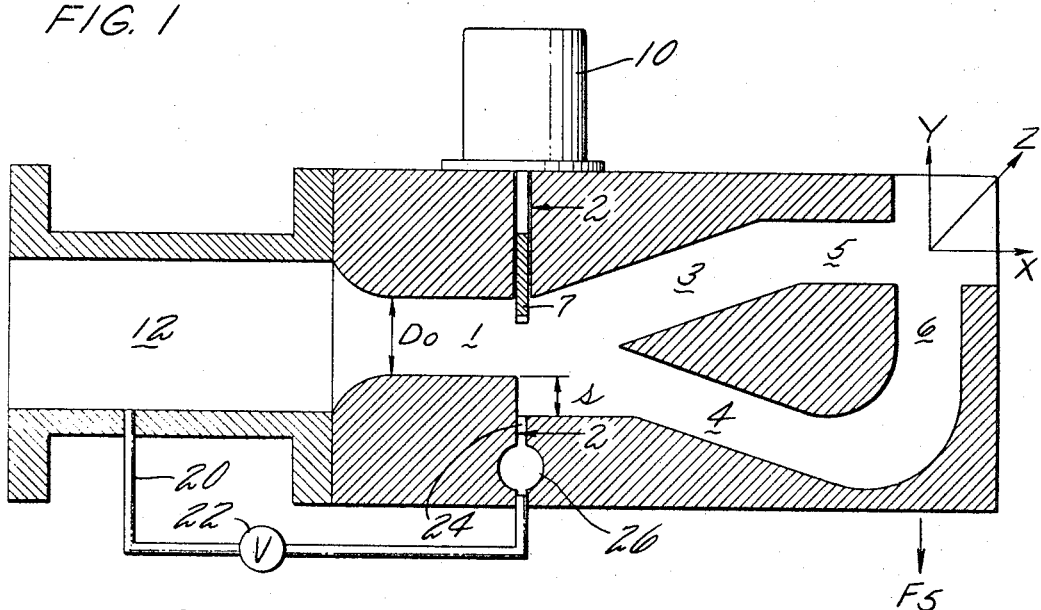
FIGURE 1 is a diagrammatic view of an aerodynamic valve showing the actuating tab.

FIGURE 1 is a diagrammatic sketch of an aerodynamic valve having a primary nozzle section 1, a primary diffuser section 2, an axial diffuser passage section 3, a lateral diffuser passage section 4, an exhaust section 5 for passage 3 and exhaust section 6 for passage 4. This valve is described in detail in U.S. application Ser. No. 517,490 to Burton A. Jones for Aerodynamic Monostable Valve, filed December 29, 1965. In this valve, the flow is directed to passage 4 and will remain in passage 4 only as long as tab 7 located at the exit of the primary nozzle section is in its fully immersed position; the flow returns to passage 3 automatically when the tab 7 is fully withdrawn, with the capability of stable intermediate flow splits between passage sections 3 and 4 at intermediate tab positions. An actuator 10 positions the tab 7. This actuator can be manually operated or automatically operated by a control system responsive to, for example, vehicle stability or direction.

The valve operates in the following manner. Gas enters the primary nozzle from conduit 12, from left to right in FIGURE 1. If the tab 7 is fully retracted, the flow follows passage section 3 and is passed through exhaust section 5 in direction X. If the tab 7 is fully immersed, the flow follows passage section 4 and passes through exhaust section 6 in direction Y. For intermediate positions of the tab 7, the flow is divided between passage sections 3 and 4, passing through exhaust sections 5 and 6, respectively, and exhausting at some intermediate angle between X and Y, giving an exhaust a direction such as Z, the angle depending on the position of the tab 7. The setback distance $s$ should be approximately one-half of the diameter of the throat of the primary nozzle section 1, $D_0$.

Figure 2:
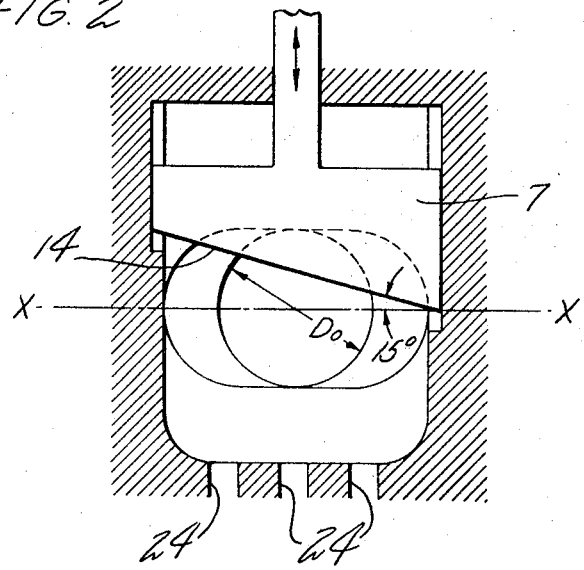
FIGURE 2 is a view taken along the line 2—2 of FIGURE 1 showing the contoured tab.

The tab 7 is formed having its moving leading edge 14 formed at an angle of 15° to the axis X—X of the primary nozzle section as seen in FIGURE 2. This is, of course, 75° to the direction of motion of the tab. Angles to be used in forming the tab 7 appear to lie in a range of from 12° to 18° to the axis X—X. The angle must be of such size so that when the tab is in its fully immersed depth, the area remaining at the nozzle exit is greater than the area at the nozzle throat. The center of the edge 14 should extend down to a maximum depth of about ¼ $D_0$.

The valve in FIGURE 1 also includes a gas bleed system whereby flow through the aerodynamic valve is bled from conduit 12 and injected along the forward edge of the setback region. A passageway 20 connects conduit 12 to a manifold 26, the manifold 26 is connected in turn to the setback region opposite the tab 7 by a plurality of slots 24. While slots have been shown, a plurality of smaller holes could be used or a larger single slot. This passageway 20 has a valve 22 therein for controlling gas flow therethrough. The minimum gas bleed flow from conduit 12 for smooth transition from flow in axial diffuser passage section 3 to lateral diffuser passage section 4 is approximately 6% of the aerodynamic valve flow. Valve 22 can be manually operated or automatically operated by a control system which could, for example, pick between a closed position of the valve where a curve such as shown in FIGURE 3 would be followed, or a valve position permitting flow through passageway 20 which is approximately 6% of the aerodynamic valve flow where a curve such as shown in FIGURE 4 would be followed.

Figure 3:
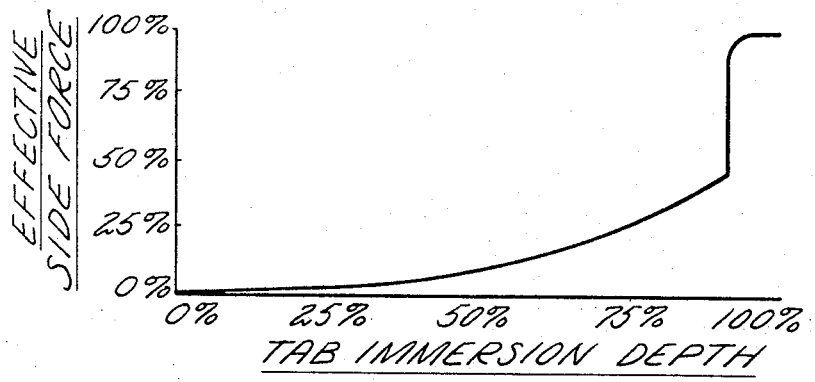
FIGURE 3 is a graph showing the relation of tab immersion depth to side force without the use of the gas bleed into setback region.

FIGURE 3 shows a curve obtained with a tab such as shown in FIGURE 2 wherein the setback of the valve was ½". The curve shown was followed for both insertion and withdrawal of the tab.

Figure 4:
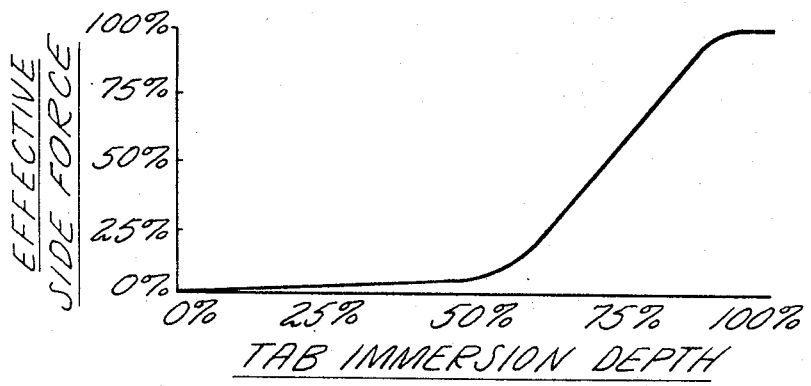
FIGURE 4 is a graph showing the relation of tab immersion depth to side force using gas bleed into setback region.

FIGURE 4 shows a curve obtained with a tab such as shown in FIGURE 2 with the gas bleed system having a flow therethrough which is 6% of the flow in the aerodynamic valve. The setback was again ½". This curve was followed for both insertion and withdrawal of the tab.

It is to be understood that the invention is not limited to the specific description above or other specific figures,

We claim:
1. In an aerodynamic valve, a first conduit means defining a flow path having an inlet and outlet, a second conduit means having an inlet and two outlets, means located adjacent the outlet of said first conduit means for directing flow therefrom into the inlet of said second conduit means for distribution into the two outlets, said last-named means including a tab movable into and out of the flow path, said tab having a leading edge, said leading edge of said tab being located at an angle less than 90° to the direction of movement of said tab, said leading edge extending across said flow path.

2. A combination as claimed in claim 1 where the angle of the leading edge of said tab is in the range of 72°–78°.

3. A combination as claimed in claim 1 where the angle of the leading edge of said tab is approximately 75°.

4. A combination as claimed in claim 1 wherein the outlet of the first conduit means and the inlet of the second conduit means are of substantially the same size on the side where the tab is located.

5. A combination as claimed in claim 1 wherein said tab controls the area of the outlet of said first conduit means.

6. In a monostable valve, a first conduit means defining a flow path having an inlet and outlet, a tab mounted adjacent the outlet of the first conduit means, said tab being movable into and out of the flow path from one side of said first conduit means, a second conduit means having an inlet and two outlets, said outlet of said first conduit means discharging into the inlet of said second conduit means, a setback portion being located at the inlet of the second conduit means opposite from the tab, and means for directing a flow of fluid into said setback portion towards said tab.

7. A combination as claimed in claim 6 wherein said first conduit means has a throat of diameter $D_0$ between said inlet and outlet, and said setback portion has a back surface with a setback distance $s$ which is approximately one half of the diameter $D_0$ of the throat.

8. A combination as claimed in claim 6 wherein the flow of fluid through said last-named means is 6% of the flow through said first conduit means.

9. A combination as claimed in claim 6 wherein the outlet of the first conduit means and the inlet of the second conduit means are of substantially the same size on the side where the tab is located.

10. A combination as claimed in claim 6 wherein said tab controls the area of the outlet of said first conduit means.

11. A combination as claimed in claim 6 wherein said last-named means includes a manifold, a third conduit means for directing a fluid from said first conduit means to said manifold, and fourth conduit means connecting said manifold to said setback portion.

12. A combination as claimed in claim 11 wherein a valve is located in said third conduit means for controlling the amount of flow into said setback portion.

13. In an aerodynamic valve, a first conduit means defining a flow path having an inlet and outlet, a tab mounted adjacent the outlet of the first conduit means, said tab having a leading edge, said tab being movable into and out of the flow path from one side of said first conduit means, a second conduit means having an inlet and two outlets, said outlet of said first conduit means discharging into the inlet of said second conduit means, a setback portion being located at the inlet of the second conduit means opposite from the tab, and said leading edge of said tab being located at an angle to a line extending normal to the direction of said tab, said leading edge extending across said flow path.

14. A combination as claimed in claim 13 wherein said angle is in the range of 12°–18°.

15. A combination as claimed in claim 13 where the angle is 15°.

16. A combination as claimed in claim 13 wherein the outlet of the first conduit means and the inlet of the second conduit means are of substantially the same size on the side where the tab is located.

17. A combination as claimed in claim 13 wherein said tab controls the area of the outlet of said first conduit means.

18. A combination as claimed in claim 13 wherein a flow of fluid is directed into said setback portion towards said tab.

19. A combination as claimed in claim 18 wherein said means includes a manifold, a third conduit means for directing a fluid from said first conduit means to said manifold and fourth conduit means connecting said manifold to said setback portion.

20. A combination as claimed in claim 19 wherein a valve is located in said third conduit means for controlling the amount of flow into said setback portion.

21. In an aerodynamic valve, a primary nozzle section having an inlet and outlet, a pair of passages having inlets downstream of said nozzle section, a primary diffuser section interconnecting the outlet of said nozzle section to the inlets of said passages, said pair of passages forming a flow divider therebetween, said flow divider having a forwardly positioned edge, a tab mounted adjacent to the outlet of the nozzle section, said tab being movable between a retracted and extended position, a setback portion being located in said diffuser section across the outlet of the primary nozzle from the tab, said tab having a leading edge, said leading edge of said tab being located at an angle less than 90° to the direction of movement of said tab, said leading edge extending transversely to said flow path.

References Cited

UNITED STATES PATENTS

| | | | |
|---|---|---|---|
| 3,187,763 | 6/1965 | Adams | 137—81.5 |
| 3,244,189 | 4/1966 | Bailey | 137—81.5 |
| 3,266,511 | 8/1966 | Turick | 137—81.5 |
| 3,266,512 | 8/1966 | Turick | 137—81.5 |
| 3,276,463 | 10/1966 | Bowles | 137—81.5 |
| 3,276,473 | 10/1966 | Lewis et al. | 137—81.5 XR |
| 3,330,483 | 7/1967 | Lewis | 137—81.5 XR |
| 3,336,932 | 8/1967 | Brooks | 137—81.5 |

SAMUEL SCOTT, *Primary Examiner.*

U.S. Cl. X.R.

239—265